(12) United States Patent
Lilley et al.

(10) Patent No.: US 6,396,904 B1
(45) Date of Patent: *May 28, 2002

(54) METHOD AND APPARATUS FOR DETERMINING WHETHER THE IMMEDIATE STATE OF A TELECOMMUNICATIONS SWITCH IS ADEQUATE FOR A SOFTWARE UPGRADE

(75) Inventors: Michael Dean Lilley, Missoula, MT (US); John Frank Saban, Lisle, IL (US); John Patrick Shea, Aurora, IL (US); Charles Robert Strohm, Downers Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/430,903

(22) Filed: Nov. 1, 1999

(51) Int. Cl.[7] .......................... H04M 1/24; H04M 3/08; H04M 3/22

(52) U.S. Cl. .......................... 379/9.04; 379/9; 379/32.1

(58) Field of Search .......................... 379/9, 9.01–9.04, 379/15.02, 32.01, 15.01, 230

(56) References Cited

U.S. PATENT DOCUMENTS 5,592,530 A * 1/1997 Brockman et al.
5,802,146 A * 9/1998 Dulman

* cited by examiner

Primary Examiner—Duc Nguyen
(74) Attorney, Agent, or Firm—R. J. Hill & Associates, Ltd.

(57) ABSTRACT

A method is provided for determining whether the immediate state of a telecommunications switch (110) is adequate for a software upgrade or retrofit. A report stream of text messages relating to the state of, and events occurring on, the telecommunications switch is received (200) by a server (102). Predetermined messages are detected in the report stream, including messages indicating hardware errors, alarms and other errors (202). The predetermined messages have a numerical value associated therewith (204). The numerical value reflects a probability of failure of a retrofit if the message is detected. As the predetermined messages are detected, their numerical values are accumulated into an accumulated value (206). If the accumulated value exceeds a threshold, the switch is not fit for the retrofit (210, 211). The time spent receiving the report stream is determined and compared against an expected time (216). If the time spent receiving the report stream does not exceed an expected time, then a determination regarding suitability for upgrade may not be reliable (218, 226). A visual portion (300, 400, 500, 600, 700) of a user interface on a client (104) is updated to reflect whether the switch is in an adequate state for a software upgrade. Hierarchical views of a user interface permit a user to view a failing subsystem, failure type, and associated detected messages in an organized manner.

36 Claims, 8 Drawing Sheets

Consolidated Status for Southern

File View Help

⬛ Southern _304_

| OFFICE NAME _308_ | COMMIT _312_ | END _314_ | STATUS _316_ | DOWN TIME _318_ | NOTES _320_ | OFL BOOT ATTEMPTS |
|---|---|---|---|---|---|---|
| CHARLOTTE (SOUTH BLVD) | | | PENDING | | | 0 |
| ORLANDO (AZALEA PARK) | | | PENDING | | | 0 |
| CHARLOTTE (REID ROAD) | | | PENDING | | | 0 |
| SHREVEPORT, LA US UNWIRED | 07/29 01:39 07/29 02:29 _350_ | 07/29 02:59 07/29 03:00 | PENDING | | | 2 |
| NEWBERRY | | | PENDING | | | 0 |
| BOWLING GREEN | | | PENDING | | | 0 |
| LEXINGTON (U OF K) | | | PENDING | | | 0 |
| CHATTANOOGA (HARRISON) | | | | | | 0 |

RETRIEVED SCHEDULE DATA FOR NEWBERRY...

NUM

METHOD AND APPARATUS FOR DETERMINING WHETHER THE IMMEDIATE STATE OF A TELECOMMUNICATIONS SWITCH IS ADEQUATE FOR A SOFTWARE UPGRADE

CROSS-REFERENCE TO RELATED APPLICATIONS

The present invention is related to, and shares some disclosure with, U.S. patent application Ser. No. 09/430,983, entitled "Method and Apparatus for Analyzing the Progress of a Software Upgrade on a Telecommunications Switch," invented by Alexander et al., and U.S. patent application Ser. No. 09/431,741, entitled "Method and Apparatus for Determining Whether the Advance State of a Telecommunications Switch is Adequate for a Software Upgrade," invented by Barshefsky et al., both of which are filed concurrently with the present application.

FIELD OF THE INVENTION

The present invention relates generally to telephone switching systems, and in particular, to a method and apparatus for analyzing the state of a telephone switching system immediately prior to a software upgrade to determine whether the software upgrade should be performed.

BACKGROUND OF THE INVENTION

Modem telephone switching systems are large-scale, highly complex systems incorporating one or more switching elements cooperatively controlled and supervised by one or more computing means. One commercial exemplar of a modem telephone switching system is the 5ESS ELECTRONIC SWITCHING SYSTEM, from Lucent Technologies Inc., 600 Mountain Avenue, Murray Hill, N.J. 07974. The 5ESS electronic switch is a distributed switching system. Both the switching system capabilities and the control, supervision and administration capabilities are distributed. Each of the computing facilities associated with these distributed capabilities includes appropriate computer programs or software to achieve he desired operation of the switching elements and other components of the switching system.

Periodically the software or computer programs used to control the components of the switching system are replaced by different software. This replacement of computer software is referred to as an upgrade or retrofit. The process of retrofitting a telephone switching system is complex. The complexity stems from the number of distributed computing facilities; the amount of software code involved; and the fact that the switching system availability must not be completely compromised for a retrofit. A typical retrofit of a switch may take from 10 to 12 hours. Resources must be employed days in advance of the retrofit for preparation. And of course, additional resources are required during the retrofit.

Problems occurring during a retrofit are obviously undesirable. Unfortunately, problems do occur. Some of these problems are readily fixed. Other problems prevent successful upgrade of the switch. Regardless of the nature of the problem, early detection of the problem is desirable. Early detection allows for early correction or rescheduling to avoid wasted resources.

A report data stream is produced by the 5ESS switching system containing text messages regarding the current state and recent operations of the switching system. The report data stream includes messages that (1) describe the state of the switch hardware; (2) report automatic actions taken by the switch; (3) report operations entered by a switch operator; (4) report results of routine or scheduled diagnostics; and (5) indicate non-routine events, abnormal conditions, errors or alarms. The report data stream is typically supplied to a "read-only" printer or "ROP" via a serial port. Hence, the report data stream is often referred to as the "ROP" or "ROP" report. The report data stream is voluminous, sometime generating 4 to 5 megabytes of data for storage in a day. Therefore, the ROP is often stored on a computer to permit searching and review for problem solving. In addition, a telecommunications switch owner often desires to have all ROP output from its switches collected in a single location for review.

A successful software retrofit requires a switch to be in a certain state. For example, faulty hardware or an incomplete upgrade of hardware components may prevent a successful software retrofit. The state of the switch required for retrofit is not typically the same as the required state of the switch for normal operation. In particular, telecommunications switches typically have redundant or fault-tolerant components and subsystems that permit normal operation in spite of some faults. Therefore, an audit of the state of the switch, beyond the typical audits for normal operation, is required prior to a software retrofit. These audits traditionally are conducted manually and begin several days or sometime weeks in advance of a scheduled retrofit.

The ROP, or its equivalent, is typically reviewed manually, or with the assistance of a computer, as a part of an audit prior to a software retrofit. However, given the voluminous nature of the ROP, especially when considering multiple switches and the vast period of time for which auditing is required, this method of auditing a switch prior to a retrofit is error prone and can be inefficient. Moreover, this method requires substantial subject matter expertise from a person manually reviewing the ROP.

In addition, no matter how much auditing is done in advance of the scheduled retrofit, problems may appear immediately prior to the retrofit that place the switch in an undesirable state, thereby preventing a successful retrofit. For example, a hardware component may fail within hours of the scheduled retrofit. Since the retrofit consumes a considerable amount of time and resources, it is desirable to manage problems that may prevent a retrofit as closely as possible, including immediately prior to a retrofit, that is, within hours of a retrofit. This requires real time observation of the switch, including the ROP, which real time observation is not feasible by manual means.

Therefore, a need exists for a more efficient and reliable method and apparatus for auditing the state of a switch, including immediately prior to a software retrofit.

SUMMARY OF THE INVENTION

In accordance with the present invention, a method is provided for determining whether to proceed with a software upgrade on a telecommunications switch. First, a report stream from the switch is received. The report stream includes messages associated with a state of the switch. In particular, the messages relate to the state of the hardware components of the switch. The report stream is searched as it is received for predetermined messages. The predetermined messages found in the search form a set of identified messages. Each predetermined message has a numerical value associated therewith. As predetermined messages are found in the report stream, an accumulated value is calculated by totaling up the numeric values for each identified message in the report stream. If the accumulated value exceeds a predetermined threshold, a user interface notifies a person that the accumulated value exceeds the predetermined threshold. This indicates that the software upgrade should not proceed based on the present state of the switch.

Preferably, a date and time for each occurrence of an identified message is stored and each identified message is also stored. The identified messages are grouped in relation to subsystems of the switch. The user interface provides hierarchical views of data relating to the determination of whether the accumulated value associated with the identified messages exceeds the predetermined threshold. At a top level in the user interface, a designated area is colored a predetermined color to indicate whether the accumulated value exceeds the predetermined threshold. Selecting the designated area reveals a second designated area, which indicates the groups or subsystems for which identified messages were found. Selecting a particular subsystem reveals a third designated area that lists the identified messages and the value each message contributed to the accumulated value. Selecting an identified message causes the user interface to reveal another designated area showing the date and time for each occurrence of the identified message. Selecting a date and time stamp for an occurrence reveals yet another designated area that shows the text stream from the report stream from the switch that produced the identified message.

In accordance with another aspect of the invention, the report stream is received for an actual period of time. The actual period of time is compared to an expected period of time. If the actual period of time does not exceed the expected period of time, then a user interface is updated to reflect this determination. In particular, the predetermined expected period of time is selected to ensure a sufficient audit of the report stream occurred. In other words, if the actual period of time does not exceed the expected period of time, then a favorable indication may not be accurate, due to a lack of information.

An apparatus in accordance with an aspect of the present invention includes a report receiver, a processor and a user interface. The report receiver receives a stream of messages from a telecommunications switch and produces a received stream of messages. Included within the received stream of messages are messages reflecting the state of the telecommunications switch. The processor is coupled to the report receiver. The processor stores the received stream of messages and searches the received stream of messages for predetermined messages to produce identified messages. Each identified message has a numerical value. The processor accumulates the numerical values for each identified message found in the report stream. The accumulated value is compared to a predetermined threshold. A user interface is coupled to the processor to reflect whether the accumulated value exceeds the predetermined threshold. Preferably, the processor compares the actual period of time that the report receiver receives the stream to an expected period of time. The user interface reflects whether the actual period of time exceeded the expected period of time. The expected period of time is a minimum measure of time for making a reliable decision from the report stream. The user interface provides hierarchical viewing of the identified messages as described above with respect to the method.

DETAILED DESCRIPTION OF THE PREFERRED EMBODIMENTS

Figure 1:
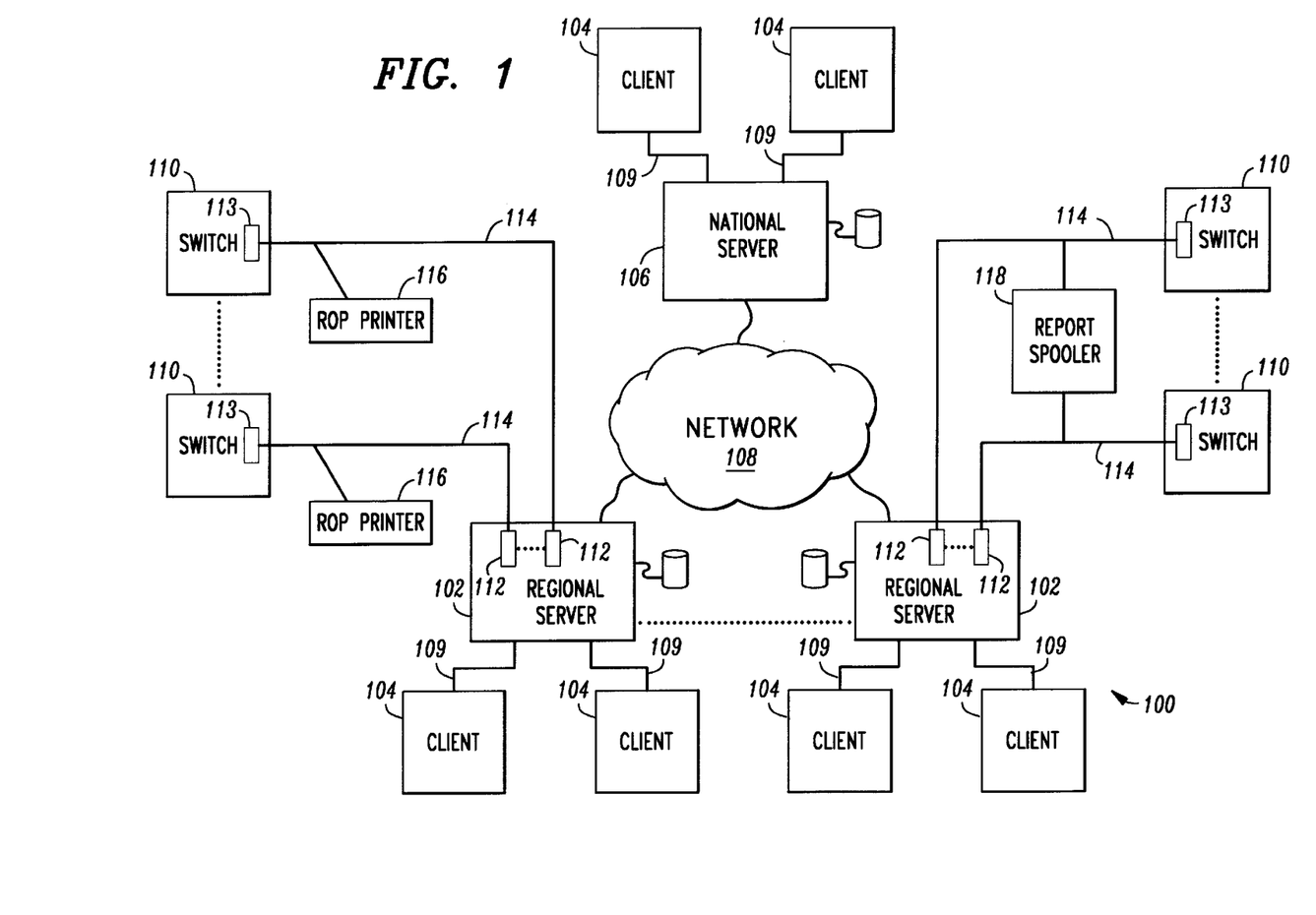
FIG. 1 is a block diagram of an apparatus for determining whether the immediate state of a telecommunications switch is adequate for a software upgrade in accordance with the present invention.

FIG. 1 is a block diagram illustrating a system 100 for determining whether the immediate state of a telecommunications switch is adequate for a software upgrade or retrofit in accordance with the present invention. System 100 includes regional servers 102, clients 104, national server 106 and network 108. Network 108 couples national server 106 and regional servers 102 together for data communications in a manner well known to those of skill in the art. Clients 104 are shown in FIG. 1 coupled to a regional server 102 or national server 106 directly by network connections 109. Alternatively, clients 104 are directly coupled to network 108. National server 106, regional servers 102 and clients 104 are general-purpose computers programmed in a manner to implement the present invention, as described further below.

Telecommunications switches 110 are coupled to system 100 to provide system 100 with information relating to the state of the telecommunications switches 110. More specifically, each telecommunications switch 110 produces a report stream 114. Report stream 114 is a serial stream of text messages reflecting the state of the telecommunications switch 110, including error messages, alarms, and other state information. Regional servers 102 include a plurality of modems 112 that are coupled to modems 113 on switches 110. Modems 112 and modems 113 are coupled together selectively over the public switched telephone network to facilitate transmission and reception of report stream 114. The report stream 114 or ROP 114 is also transmitted to a ROP printer 116 or to a ROP spooler 118. ROP spooler 118 typically is a computer that receives ROP 114 and stores ROP 114 for future processing.

In the preferred embodiment, regional servers 102 are coupled to switches 110 to receive ROP 114 prior to a software upgrade. Most preferably, regional servers 102 are coupled to switches 110 six to eight hours prior to the beginning of the software upgrade. Regional servers 102 are preferably geographically disbursed in a region near the associated switches 110. Network 108 provides a means for regional servers 102 to communicate with each other and a national server 106. National server 106, as the name implies, is a centralized national server that is coupled to all regional servers 102. This hierarchical arrangement permits regional servers 102 to monitor switches within its associated region and then for the national server 106 to monitor all regions via connections to the regional servers 102.

National server 106 and regional servers 102 are preferably implemented as a single or multiple general-purpose computers. For example, servers 102, 106 are PENTIUM-class computers running the WINDOWS NT operating system with SERVICE PACK 5 from Microsoft Corporation.

Clients 104 are also general-purpose computers with monitors and keyboards provided for engineers and technicians to interface with system 100. For example, clients 104 are PENTIUM-class computers running WINDOWS 98, WINDOWS 95 or WINDOWS NT with SERVICE PACK 5, all from Microsoft Corporation.

Figure 2A:
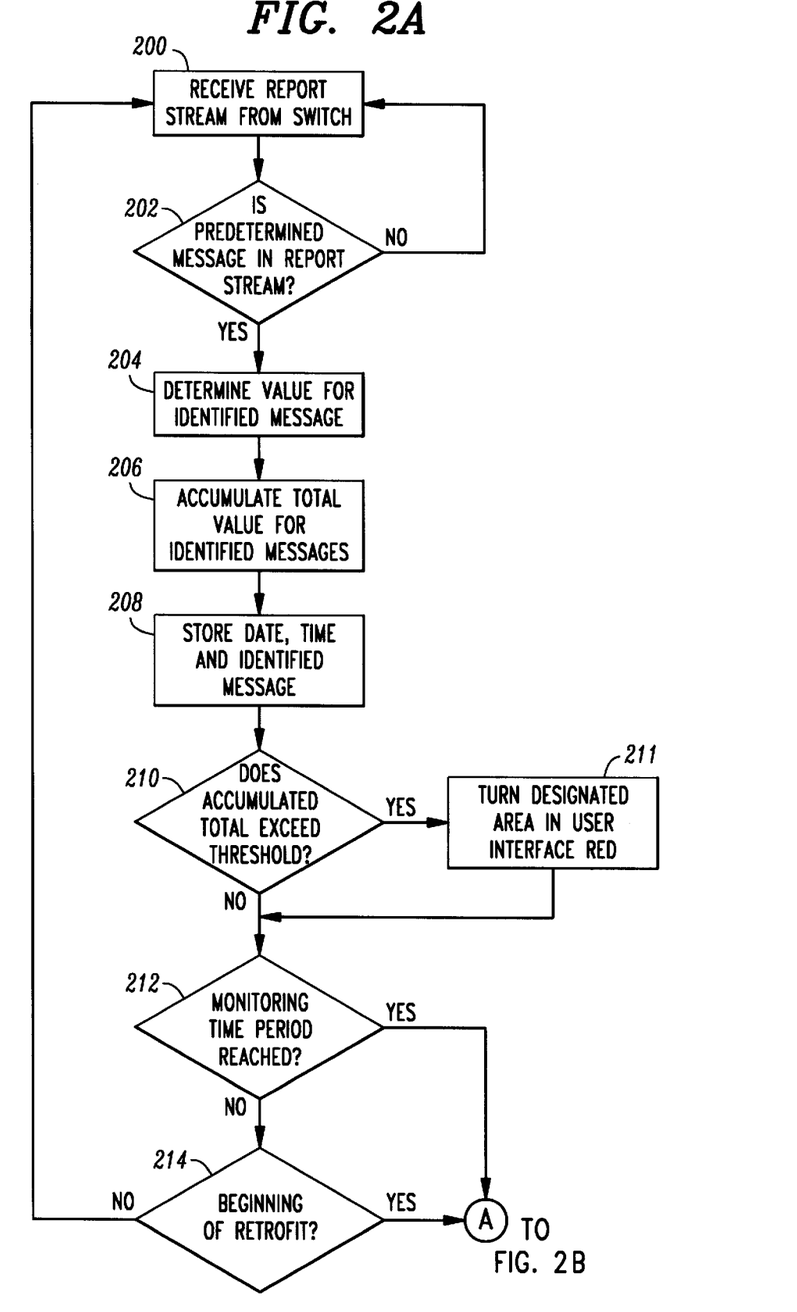
FIGS. 2A–B are a flow chart illustrating a method for determining whether the state of a switch is adequate for a software upgrade in accordance with the present invention.
Figure 2B:
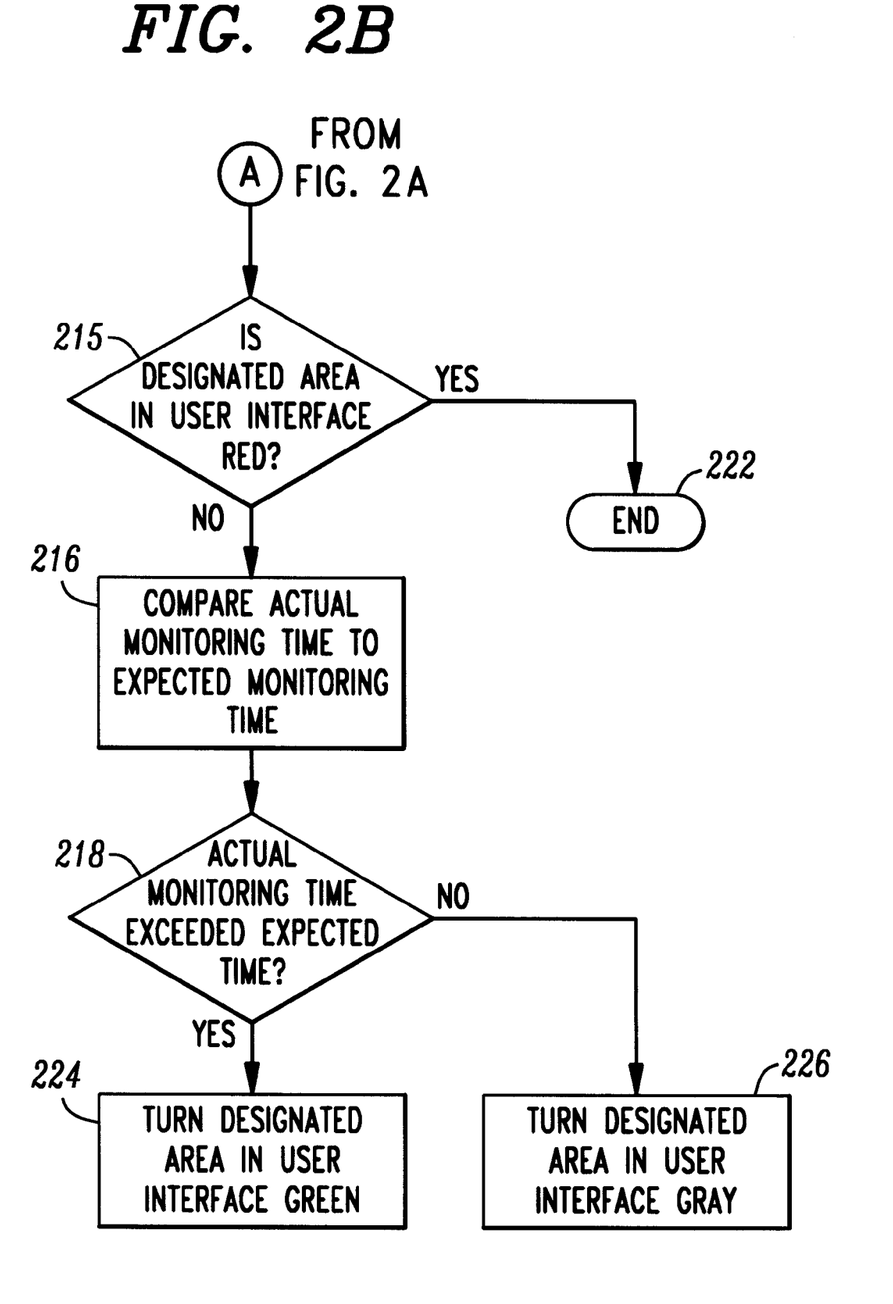

FIG. 2A–2B are a flow chart illustrating a method for determining whether the immediate state of a telecommunications switch is adequate for a software upgrade in accordance with the present invention. First a report stream is received from the switch (200). The report stream includes a plurality of text messages associated with a state of the switch. preferably the report stream is received via a modem. Most preferably the report stream is stored in a file as it is received. As the report is received, a search is made of the report stream for predetermined messages (202). Identified messages are produced as a result of the search for the predetermined messages. In other words, each predetermined message found in the report stream results in an identified message. Each identified message has a numerical value associated therewith. Preferably, the predetermined messages are stored in a database and the database includes the numeric value for each occurrence of the predetermined message. The database also includes other data associated with the message such as the subsystem of the switch associated with the message and text that explains the meaning of the predetermined message. Preferably, the database is a SYBASE database. SYBASE is available from Sybase, Inc., 6475 Christie Avenue, Emeryville, Calif. 94608-1050.

Table 1 below list exemplary predetermined messages that are identified in the preferred embodiment associated with the 5ESS switching system. The "Item" column indicates an item name for the message. The "Group" column indicates the subsystem associated with the message. In the preferred embodiment, the subsystems are "AM" for the administrative module, "SM" for the switching module, "CM" for the communications module, "CNI" for the common network interface, and "SM DGN" for miscellaneous diagnostic problems. The "Description" column includes a text message that is displayed in a user interface, as discussed below. The "Value" column indicates the numeric value that is accumulated for an occurrence of the message. The actual message detected in the report stream is determined as "String1" "OP" "String2," where "String1" list a stream of text that must occur in the report stream; "Op" is a Boolean operation, such as "AND" or ""OR"; and "String2" list a stream of text. The streams of text in String1 and String2 include symbols for parsing, such as don't cares, etc. The symbols follow a UNIX-style regular expression convention. The "Op" column is a "0" to indicate no Boolean operation, "1" to indicate AND, and "2" to indicate OR.

TABLE 1

| Item | Group | Description | Value | String1 | Op | String2 |
|---|---|---|---|---|---|---|
| DKDRV | AM | Disk driver error | 1 | REPT DKDRV | 0 | |
| IODRV | AM | Seek AM support assistance | 1 | REPT IODRV | 0 | |
| SIMCHK | AM | Link-related. Comes in pairs (usually). Excessive amount indicates bad links. Allowing 10 pairs of messages. | 50 | REPT SIMCHK | 0 | |
| Ring Transport | CNI | Seek assistance from CNI/CCS support | 5000 | REPT RING TRANSPORT | 0 | |
| CNI Ring | CNI | Seek assistance from CNI/CCS support | 5000 | ^\*[C\*] REPT CNI RING | 0 | |
| CNCE | CNI | Major or Critical CNCE. Seek CCS technical assistance. | 10000 | ^\*[C\*] REPT CNCE | 0 | |
| CLNKMON | CNI | Alarmed RMV CLNK. Limit 10., Seek assistance from CM support. | 1000 | ^\*[C\*] RMV CLNK | 0 | |
| CNCE (MINOR) | CNI | Minor alarm CNCE. | 2000 | ^\* REPT CNCE | 0 | |
| CNI INIT | CNI | CNI Initialization | 5000 | \*[C\*] INIT CNI | 0 | |
| Ringmon | CNI | RINGMON | 2000 | REPT RINGMON | 0 | |
| REPT TRBL (CRITICAL) | CM | Critical alarm CM trouble. Limit 5, Seek assistance from CM support. | 2000 | \*C REPT TRBL, | 0 | |
| REPT TRBL (MAJOR) | CM | Major alarm CM trouble. Limit 10, Seek assistance | 1000 | \*\* REPT TRBL, | 0 | |

TABLE 1-continued

| Item | Group | Description | Value | String1 | Op | String2 |
|---|---|---|---|---|---|---|
| REPT TRBL (MINOR) | CM | Minor alarm CM trouble. Limit 20. Seek assistance from CM support. | 500 | ^\* REPT TRBL, | 0 | |
| REPT TRBL (NO ALARM) | CM | No-alarm CM trouble. Limit 100. Seek assistance from CM support. | 100 | ^ *REPT TRBL, | 0 | |
| MSGSMON | CM | Limit 20, Seek assistance from CM support | 500 | REPT MSKP_ENV | 0 | |
| ONTCMON | CM | TMS Fault. Limit 10. Seek assistance from CM support. | 1000 | REPT TMS=. ASYNC | 0 | |
| Failing PRM | AM | Even one is trouble. Seek assistance from AM support. | 10000 | PRM_[01] F | 0 | |
| DFC DGN | AM | Seek AM support assistance | 10000 | DGN DFC.* STF | 0 | |
| MHD DGN | AM | Seek AM support assistance | 10000 | DGN MHD.* STF | 0 | |
| CU DGN | AM | Seek AM support assistance | 10000 | DGN CU.* STF | 0 | |
| IOP DGN | AM | Seek AM support assistance | 10000 | DGN IOP.* STF | 0 | |
| MT DGN | AM | Seek AM support assistance | 10000 | DGN MT.* STF | 0 | |
| MTC DGN | AM | Seek AM support assistance | 10000 | DGN MTC.* STF | 0 | |
| MCTSI DGN | SM DGN | Seek SM support assistance | 10000 | DGN MCTSI=.* STF | 0 | |
| PSUPH DGN | SM DGN | Seek SM support assistance | 10000 | DGN PSUPH=.* STF | 0 | |
| PSUCOM DGN | SM DGN | Seek SM support assistance | 10000 | DGN PSUCOM=.* STF | 0 | |
| LDSUCOM DGN | SM DGN | Seek SM support assistance | 10000 | DGN LDSUCOM=.* STF | 0 | |
| DNUS DGN | SM DGN | Seek SM support assistance | 10000 | DGN DNUSC[CD]=.* STF | 0 | |
| CMP DGN | CM | Seek CM support assistance | 10000 | DGN CMP=.* STF | 0 | |
| DLI DGN | CM | Seek CM support assistance | 10000 | DGN DLI=.* STF | 0 | |
| NLI DGN | CM | Seek CM support assistance | 10000 | DGN NLI=.* STF | 0 | |
| QGP DGN | CM | Seek CM support assistance | 10000 | DGN QGP=.* STF | 0 | |
| QLPS DGN | CM | Seek CM support assistance | 10000 | DGN QLPS=.* STF | 0 | |
| Ring Configuration | CNI | Seek assistance from CNI/CCS support | 2000 | REPT RING CFR | 0 | |
| OFLBOOT | AM | Seek AM or LOT support assistance | 10000 | EXC OFLBOOT ABORTED | 2 | EXC OFLBOOT TERMINATED |
| OFFLINE BOOT | AM | Seek AM or LOT support assistance | 10000 | EXC OFLINE BOOT TERMINATED | 2 | EXC OFLINE BOOT ABORTED |
| REPT OFLBOOT | AM | Seek AM or LOT support assistance | 10000 | REPT OFLBOOT ABORTED | 2 | REPT OFLBOOT TERMINATED |
| OFLBOOT ERR | AM | Seek AM or LOT support assistance | 10000 | REPT OFLBOOT ERR | 0 | |
| AM INIT | AM | Full or Selective Init | 10000 | INIT AM.*LVL=[FS] | 0 | |
| CMP PRIM INIT | CM | Full or Selective Init | 10000 | INIT CMP=0-PRIM.*LVL=[FS] | 0 | |
| SM SPP | SM | SM Single Process Purge, Will interfere with | 100 | INIT SM=.*LVL=SPP | 2 | REPT SM=.*LVL=SPP.*COMPLETED |

TABLE 1-continued

| Item | Group | Description | Value | String1 | Op | String2 |
|---|---|---|---|---|---|---|
| | | offline pump. Seek SM support assistance. | | | | |
| ODD BACKUP | AM | Failed ODD backup. Seek assistance from LOT or RC/DB support | 10000 | BKUP ODD.*ABORTED | 2 | BKUP ODD.*STOPPED |
| SM INITIALIZATION | SM | SM Initialization, Seek SM support assistance | 10000 | REPT SM=.*LVL=[FS]\| | 0 | |
| FILESYSTEM OVERFLOW | AM | File systems /rclog and /updtmp are important to double-logging, evolution and reapplication. Seek LOT support assistance. | 10000 | REPT.*FILESYS.* CRITICAL.*OVER FLOW.*updtmp | 2 | REPT.*FILESY S.*CRITICAL.* OVERFLOW.* UPDTMP |
| FILESYSTEM OVERFLOW | AM | File systems /rclog and /updtmp are important to double-logging, evolution and reapplication. Seek LOT support assistance. | 10000 | REPT.*FILESYS.* CRITICAL.*OVER FLOW.*rclog | 2 | REPT.*FILESY S.*CRITICAL.* OVERFLOW.* RCLOG |
| CORC EVOLUTION | AM | CORC Evolution failed to complete normally. Seek LOT support assistance. | 10000 | CNVT CORCLOG EVOL STOPPED | 0 | |
| RC VIEW EVOLUTION | AM | RC View Evolution failed to complete normally. Seek LOT support assistance. | 10000 | CNVT RCLOG EVOL STOPPED | 0 | |

Table 2 below gives a brief message description for each of the "Items" in Table 1.

TABLE 2

| Item | Message Description |
|---|---|
| DKDRV | Reports illegal operations requested from Disk File Controller, DFC not in ready state, DFC internal software or hardware error(s) |
| IODRV | Reports internal software error from IOP (Input-Output Processor) |
| SIMCHK | Indicative of links to remote systems going up and down. Will affect real-time performance of AM processor |
| Ring Transport | Reporting hardware or software error that can disrupt communication on the CNI ring. |
| CNI Ring | Reports the CNI ring is unable to handle traffic after an initialization |
| CNCE | Major alarm CNI Critical Event (CNCE) |
| CLNKMON | Alarmed message. C-LINK removal is alarmed when it's a serious problem |
| CNCE (MINOR) | Minor alarm CNI Critical Event (CNCE), less weight. |
| CNI INIT | Reports a manual or automatic CNI ring initialization. |
| Ringmon | Reports the CNI ring monitor program has performed a maintenance or recovery action on the ring. |
| REPT TRBL (CRITICAL) | Critical alarm Communications Module (CM) action taken |
| REPT TRBL (MAJOR) | Major alarm Communications Module (CM) action taken, less weight |
| REPT TRBL | Minor alarm Communications Module (CM) action |

TABLE 2-continued

| Item | Message Description |
|---|---|
| (MINOR) | taken, even less weight. |
| REPT TRBL (NO ALARM) | No-alarm Communications Module (CM) action taken, even less weight yet |
| MSGSMON | Reports abnormal operation or recovery action taken on the CM |
| ONTCMON | Reports occurrence of a time multiplexed switch (TMS) fault asynchronous error report. |
| Failing PRM | Reports one failing AM processor recovery message. Should never happen. |
| DFC DGN | Failing diagnostic on Disk File Controller |
| MHD DGN | Failing diagnostic on Moving Head Disk |
| CU DGN | Failing diagnostic on Control Unit (CPU of AM) |
| IOP DGN | Failing diagnostic on Input/Output Processor complex |
| MT DGN | Failing diagnostic on Magnetic Tape Unit |
| MTC DGN | Failing diagnostic on Magnetic Tape Controller |
| MCTSI DGN | Failing diagnostic on SM module controller time slot interchange unit |
| PSUPH DGN | Failing diagnostic on SM module packet switch unit packet handler card |
| PSUCOM DGN | Failing diagnostic on SM module packet switch unit common control unit |
| LDSUCOM DGN | Failing diagnostic on SM module local digital service unit (tone generators and receivers) |
| DNUS DGN | Failing diagnostic DNUS control or data circuitry |
| CMP DGN | Failing diagnostic on CMP controller |

TABLE 2-continued

| Item | Message Description |
|---|---|
| DLI DGN | Failing diagnostic on dual link interface |
| NLI DGN | Failing diagnostic on network link interface |
| QGP DGN | Failing diagnostic on QLPS gateway processor |
| QLPS DGN | Failing diagnostic on quad-link packet switch |
| Ring Configuration | Either the CNI ring just left the abnormal state and returned to the normal state, or vice versa |
| OFLBOOT | Offline boot operation in AM took a fault |
| OFFLINE BOOT | Offline boot operation in AM took a fault |
| REPT OFLBOOT | Offline boot operation in AM took a fault |
| OFL BOOT ERR | Offline boot operation in AM took a fault |
| AM INIT | AM processor took full or selective initialization |
| CMP PRIM INIT | CMP processor took full or selective initialization |
| SM SPP | An SM process was killed unexpectedly |
| ODD BACKUP | Database backup operation (RAM memory to disk) failed. |
| SM INITIALIZATION | An SM took full or selective initialization |
| FILESYSTEM OVERFLOW | Disk filesystem needed for retrofit fell to no available space. |
| FILESYSTEM OVERFLOW | Disk filesystem needed for retrofit fell to no available space. |
| CORC EVOLUTION | Critical retrofit operation terminated abnormally |
| RC VIEW EVOLUTION | Critical retrofit operation terminated abnormally |

The numeric value for the identified message is determined (204) by retrieving the value from the database. Then an accumulated total is determined (206). The accumulated total is the sum of all the values for each identified message in the message stream. For example, with reference to Table 1, if a report stream contains two SIMCHK (row 3) items and one Ring Transport (row 4) item, the accumulated total is 5100, that is 50+50+50+50 5000. String1, Op, and String2 of rows 3 and 4 of Table 1 define the text received in the report stream.

In addition to keeping an accumulated total, the actual report stream message that included a predetermined message or "item" is stored in a log file along with the time and date stamp detected from the report stream (208). The log file is used for subsequent problem diagnosis and analysis in conjunction with the user interface, as discussed below. A preferred alternative to storing the report stream message in a separate log file is to store a pointer or offset to the report stream message with reference to a log of the entire report stream.

A threshold is predetermined for an accumulated value that is unacceptable. This threshold is typically based on experience associated with problems or state conditions that identify problems that hinder an upgrade or retrofit. In a preferred embodiment that uses the exemplary messages listed in Table 1 above, the threshold is set at 10,000. As the accumulated total changes, the accumulated total is compared against the threshold (210). If the accumulated total exceeds the threshold, then a designated area in the user interface is updated to reflect that the threshold has been exceeded (211). Preferably, an area in the user interface is associated with the switch being monitored and that area is colored red to signify that the threshold has been exceeded and that an upgrade or retrofit should not be performed prior to addressing the noted problems. Monitoring preferably continues even though the threshold is reached.

In a preferred embodiment, monitoring of the ROP is limited to a predetermined period of time, typically, six to eight hours. This monitoring time period is checked (212). If the monitoring time period has not been reached or exceeded, monitoring continues. If the retrofit begins prior to the monitoring time period (214), then monitoring is halted. In other words, if the upgrade or retrofit begins prior to the end of the monitoring time period, further monitoring is discontinued. Of course, if the upgrade begins, the need for a determination of whether to retrofit is moot.

At the end of monitoring, whether due to the beginning of the retrofit or the end of the monitoring time period, the user interface may be updated to reflect the determination of whether the retrofit should proceed. If the designated area in the user interface is red (215), then there is no need to further update the user interface (222). In this case, the retrofit should not proceed because the accumulated value exceeds the threshold. If the designated area in the user interface is not red, that is, if the accumulated value does not exceed the threshold, then the actual monitoring time is compared against the expected monitoring time (216). If the actual monitoring time exceeds the expected monitoring time (218) then the designated area in the user interface is colored green to indicate that the determination is favorable (224). In this case, the monitoring time is sufficient to make a determination of whether to proceed with the retrofit and the retrofit should proceed. If the actual monitoring time does not exceed the expected monitoring time (218), then the user interface is updated accordingly. More specifically, the designated area in the user interface is colored gray to indicate that the monitoring did not occur for the required amount of time (226).

The method described above is preferably implemented with software running on servers 102, 106 and clients 104. The core monitoring application is preferably a multi-threaded NT service written in C++. This core monitoring application manages the connections to the switches 110, collects and stores data from the switches 110, and performs the analysis. For example, In order to connect to a switch, the server spawns a thread for that switch. All monitoring activities for that switch take place within the thread. Internal communications between applications is preferably accomplished using TCP/IP sockets. Data used to control the application, e.g. the predetermined messages, and data stored from the application, e.g., the identified messages, are stored in a database. A C++ library that encapsulates the database primitives provides application access to the database. The user interface is preferably a Microsoft Visual C++ application.

Figure 3:
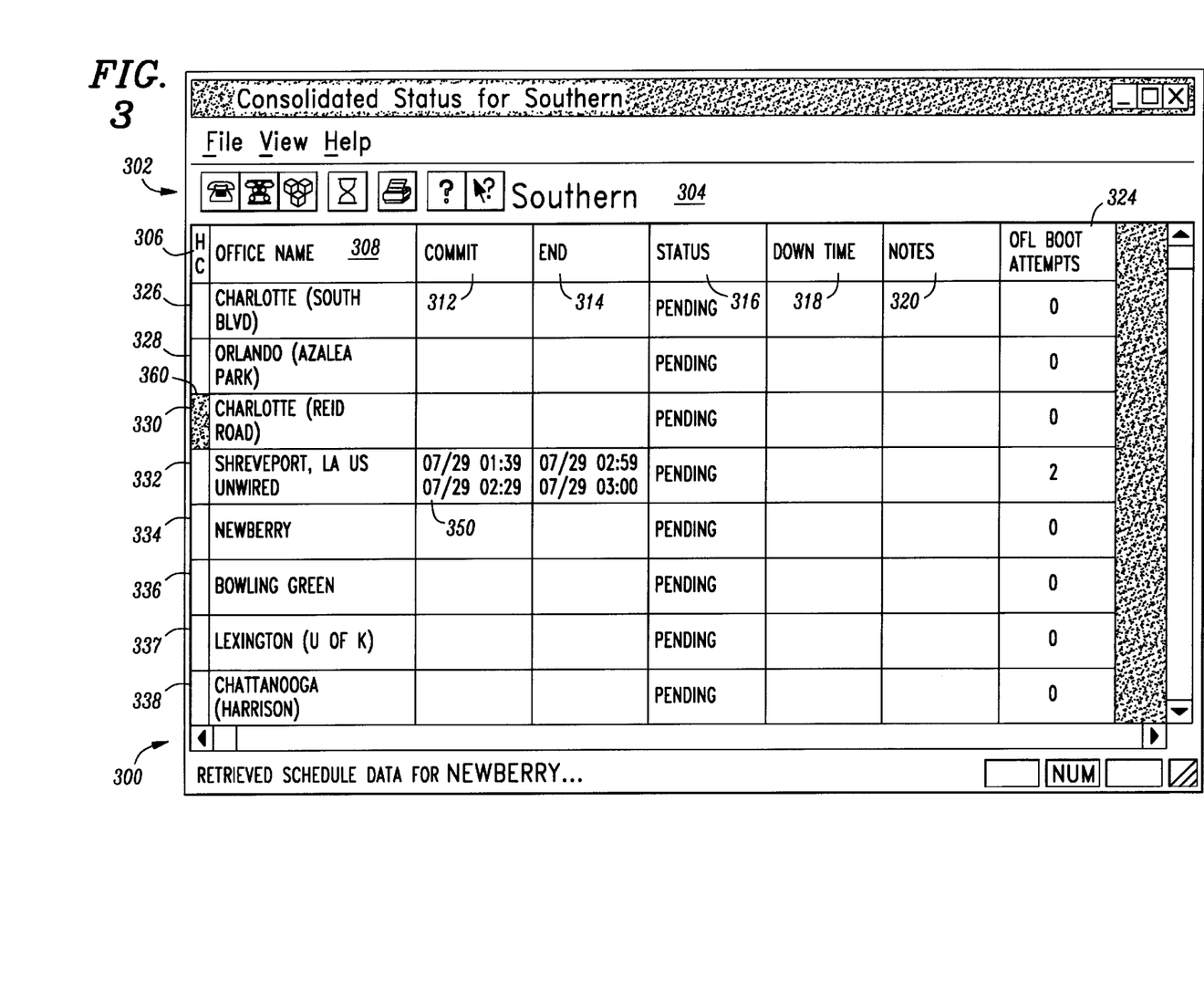
FIG. 3 is a diagram showing a user interface display in accordance with the present invention.

FIG. 3 is a diagram illustrating a visual portion of a user interface for displaying the progress of a software upgrade on a telecommunications switch and for displaying the results of a determination of whether the immediate state of a telecommunications switch is adequate for a software upgrade in accordance with the present invention. Preferably, the user interface is implemented on a client 104. Client 104 preferably has software that accesses the database on a server 102, 106 and reflects changes made in the database in a visually aesthetic manner. Preferably, the user interface is displayed on a computer monitor.

Display 300 is a consolidated status display. Display 300 collectively shows in one screen the progress of multiple switches or offices undergoing or scheduled for a software upgrade. Display 300 includes a tool bar area 302, with short cuts or buttons for selecting certain commands, including commands to connect to and disconnect from a server. A region area 304 displays a label associated with the particular region being monitored, in this example, the "Southern" region. The display 300 is characterized by a set of columns and rows. Column 306 labeled "HC" relates to a "health check" conducted in accordance with the present invention. That is, the "HC" column reflects the determination of whether to proceed with the retrofit as determined by the method illustrated in FIG. 2A–2B. Column 308 includes the name of the office or switch. In other words, column 308 lists the particular switch that is scheduled for a retrofit, generally by geographical designation. Columns 312, 314, 316, 318, 320 and 324 list certain stages of the retrofit and other pertinent fields relating to the retrofit. Column 312 relates to the COMMIT stage and column 314 relates to the END stage. Other stages are preferably displayed by scrolling horizontally in display 300. Column 316 gives the status of the retrofit. The status column is populated with "Pending," "Succeed,""Failure" or "Abort." Pending indicates the office will retrofit within five to seven days; Succeed indicates the retrofit was successful; Failure indicates the retrofit was not successfully completed; and Abort indicates the office retrofitted, but returned to the old generic. Column 318 relates to the down time associated with the retrofit; column 320 lists the time of the most recent note entered, If any; and column 324 lists the number of OFL boot attempts. Each row 326, 328, 330, 332, 334, 336, 337, 338 of display 300 relates to the switch or office listed in column 308 of the row. A further description of display 300 is found in co-pending patent application Ser. No. 09/430,983, entitled "Method and Apparatus for Analyzing the Progress of a Software Upgrade on a Telecommunications Switch," invented by Alexander et al.

Display 300 gives an immediate visually perceptible indication of the results of the determination of whether to proceed with the retrofit, that is, the health check. For example, box 360 (column 306, row 330) is colored red to indicate that the switch at Charlotte (Reid Road) did not pass the health check. Display 300 does not provide any details regarding the cause of failure of the health check. Further details are made available about the health check by selecting box 360, for example, by double clicking box 360 with a mouse or other pointing device. The further details are provided hierarchically by displaying an additional level of detail in another display in the user interface.

Figure 4:
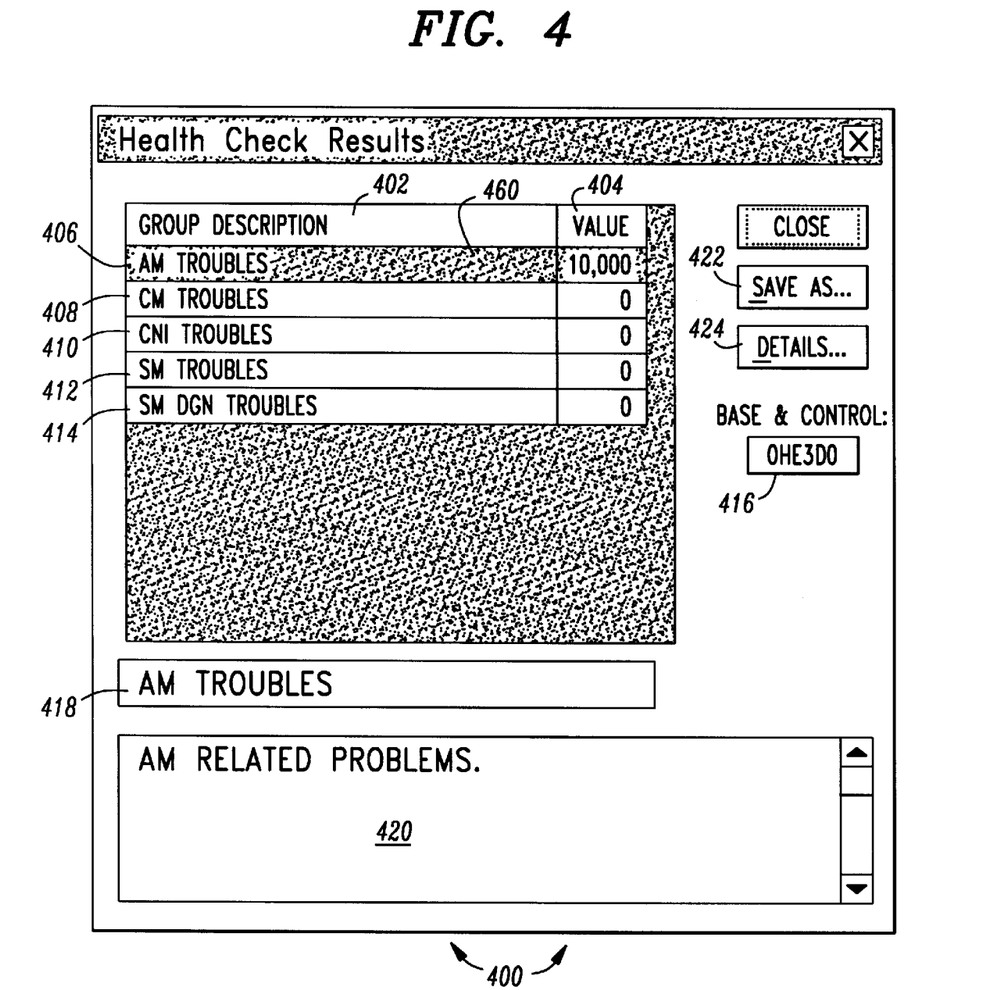
FIG. 4 is a diagram showing another user interface display that is revealed in response to a selection made on the display shown in FIG. 3.

FIG. 4 illustrates a display 400 that is made visually perceptible in response to a user selecting box 360 in display 300. Display 400 includes columns 402 and column 404. Column 402 is entitled "Group Description" and list the subsystems used to categorize the predetermined messages, as discussed above with respect to Table 1. Column 404 is entitled "Value" and list the portion of the accumulated value associated with the subsystem, as determined by the messages identified during the monitoring of the ROP. Rows 406, 408, 410, 412 and 414 relate to a specific subsystem as listed in column 402.

Display 400 permits a user to identify a subsystem(s) that caused the health check to fail. The office or switch is identified in display 400 in the base and control box 416. A text pane 418 shows the subsystem highlighted by a cursor. A text pane 420 displays text associated with the selected subsystem. Display 400 is saved as a file by selecting the save as button 422. Additional details regarding any subsystem are obtained by selecting the details button 424 or by selecting the subsystem area. For example, additional details regarding the AM troubles are displayed by selecting the box 460 defined by the intersection of column 402 and row 406. Preferably the subsystem(s) that caused the health check to fail is colored red. Most preferably, the subsystems are displayed in order based upon accumulated value with the highest accumulated value listed first.

Figure 5:
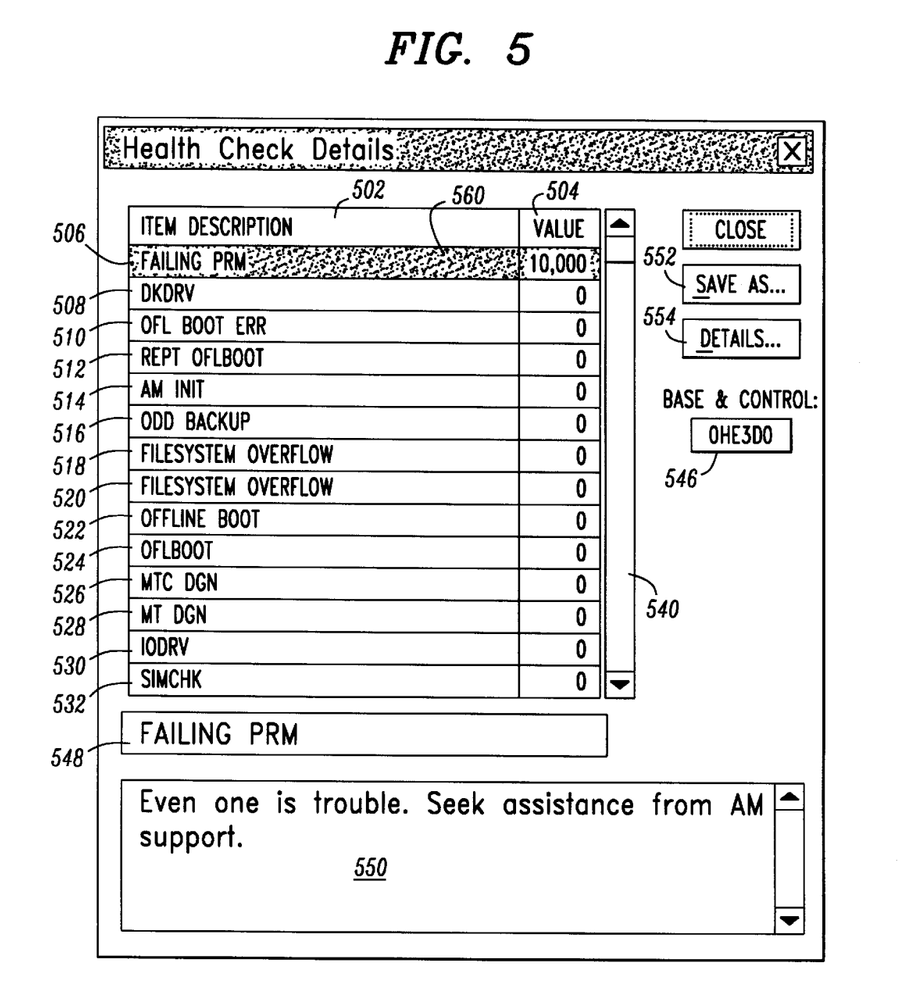
FIG. 5 is a diagram showing another user interface display that is revealed in response to a selection made on the display shown in FIG. 4.

FIG. 5 illustrates a display 500 that is made visually perceptible in response to a user selecting box 460 in display 400. Display 500 includes column 502 and column 504. Column 502 is entitled "Item Description" and list the item associated with the predetermined messages, as discussed above with respect to Table 1. Column 504 is entitled "Value" and list the portion of the accumulated value associated with the item, as determined by the messages identified during the monitoring of the ROP. Rows 506, 508, 510, 512, 514, 516, 518, 520, 522, 524, 526, 528, 530 and 532 list the items associated with the specific subsystem selected. Scroll bar 540 is used to display additional rows of items.

Display 500 permits a user to identify the item(s) and associated values for the subsystem selected. The office or switch is identified in display 500 in the base and control box 546. A text pane 548 shows the item highlighted by a cursor. A text pane 550 displays text associated with the selected item. In particular text pane 550 displays the text message stored with the item in the database, e.g., the "Description" field of Table 1 above. Display 500 is saved as a file by selecting the save as button 552. Additional details regarding any item are obtained by selecting the details button 554 or by selecting the item area. For example, additional details regarding the item "Failing PRM" is displayed by selecting the box 560 defined by the intersection of column 502 and row 506. Preferably the item(s) that caused the health check to fail is colored red. Most preferably, the items are listed in order based upon the value column 504 with the highest value listed first.

Figure 6:
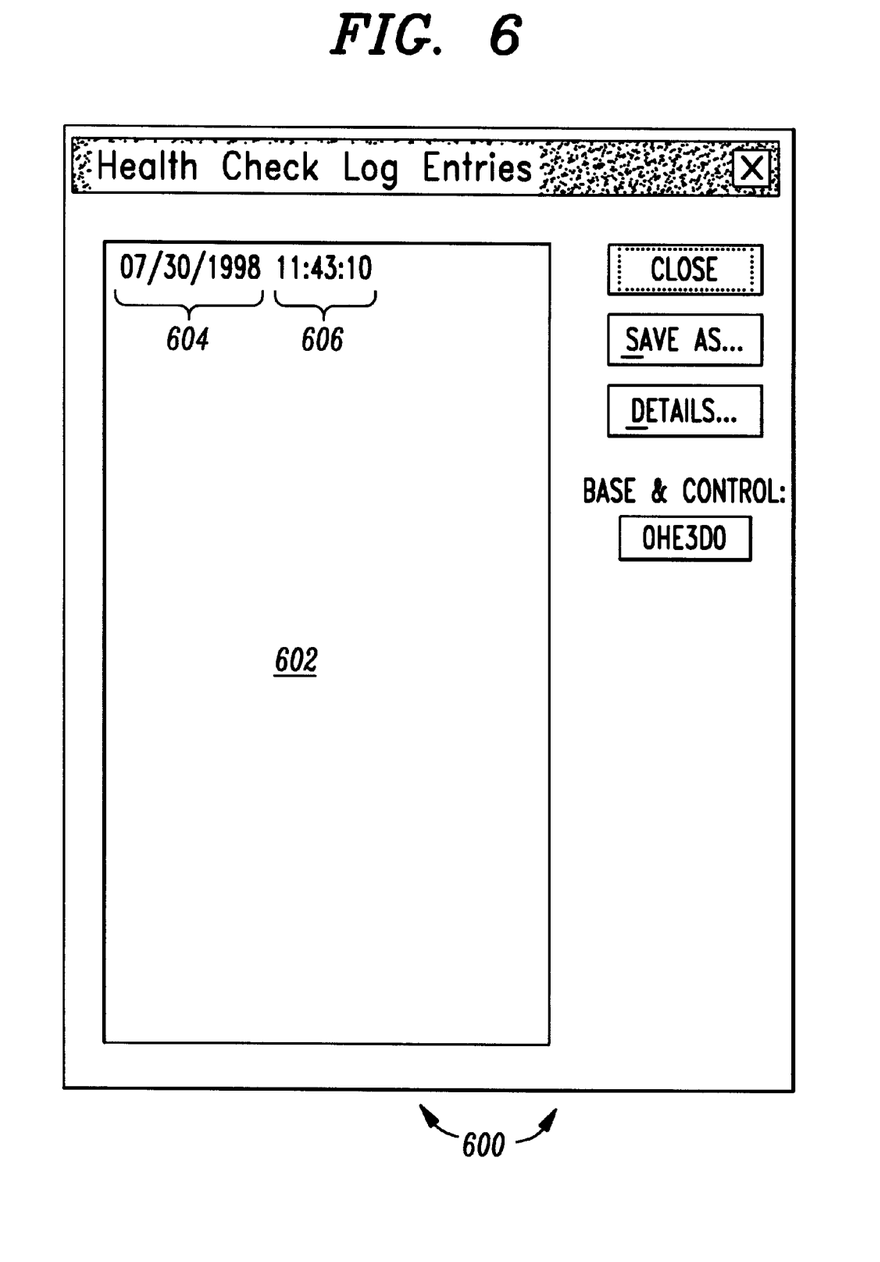
FIG. 6 is a diagram showing another user interface display that is revealed in response to a selection made on the display shown in FIG. 5.

FIG. 6 illustrates a display 600 that is made visually perceptible in response to a user selecting box 560 in display 500. Display 600 includes a text pane 602 that displays a date field 604 and a time field 606 for each occurrence of a predetermined message associated with a selected item. In text pane 602 one occurrence of the "Failing PRM" item on Jul. 7, 1998 at 11:43 am is listed. Display 600 allows a user to see the number and date and time of occurrences of the predetermined messages associated with a selected item. Display 600 is saved as a file by selecting the save as button 610. Additional details regarding a particular occurrence of a message are obtained by selecting the area containing the date field 604 and time field 606 for the message. For example, additional details regarding the message occurring on Jul. 7, 1998 at 11:43 A.M. are displayed in response to selecting the date field 604 and time field 606.

Figure 7:
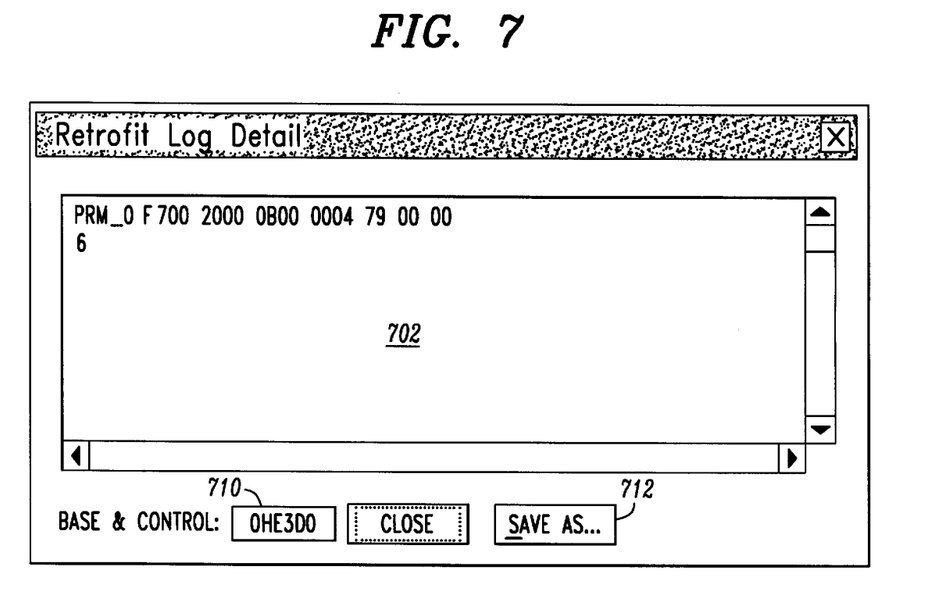
FIG. 7 is a diagram showing another user interface display that is revealed in response to a selection made on the display shown in FIG. 6.

FIG. 7 illustrates a display 700 that is made visually perceptible in response to a user selecting a date or time field in display 600. Display 700 includes a text pane 702 that list the ROP output that resulted in an item. Display 700 permits a user to see the ROP output that caused a particular message that resulted in an item. The office or switch is identified in display 700 in the base and control box 710. Display 700 is saved as a file by selecting the save as button 712. Display 700 show the lowest level of detail relating to a particular predetermined message found while monitoring a ROP.

The present invention provides a method and apparatus for efficient auditing of the state of a telecommunications switch immediately prior to a software upgrade. The audit or "health check" determines the suitability of the switch for a software upgrade. The results of the health check are conveyed to a user in a hierarchical manner allowing a user to examine events of interest in an organized and efficient manner.

The invention being thus described, it will be evident that the same may be varied in many ways. Such variations are not to be regarded as a departure from the spirit and scope of the invention and all such modifications are intended to be included within the scope of the appended claims.

What is claimed is:

1. A method for determining whether to proceed with a software upgrade on a switch comprising the steps of:
  A) receiving a report stream from the switch, wherein the report stream includes a plurality of messages associated with a state of the switch;
  B) searching the report stream for predetermined messages to produce identified messages, wherein each identified message has a numerical value;
  C) accumulating the numerical value for each identified message to produce an accumulated value; and
  D) determining whether the accumulated value exceeds a predetermined threshold.

2. The method of claim 1 further comprising the step of:
  E) updating a user interface to reflect whether the accumulated value exceeds the predetermined threshold.

3. The method of claim 2 further comprising the steps of:
  F) receiving the report stream for an actual period of time;
  G) comparing the actual period of time to an expected period of time; and
  H) updating the user interface to reflect whether the actual period of time exceeded the expected period of time.

4. The method of claim 1 further comprising the step of:
  E) storing a date and time for receipt of each identified message.

5. The method of claim 4 further comprising the step of:
  F) storing each identified message.

6. The method of claim 3 wherein the user interface includes a first designated area to reflect whether the accumulated value exceeds the predetermined threshold, wherein the first designated area is visually perceptible.

7. The method of claim 6 wherein the first designated area is colored a first predetermined color to reflect that the accumulated value exceeded the predetermined threshold.

8. The method of claim 7 wherein the first designated area is colored a second predetermined color to reflect that the accumulated value did not exceeded the predetermined threshold and the actual period of time exceeded the expected period of time.

9. The method of claim 8 wherein the first designated area is colored a third predetermined color to reflect that the actual period of time did not exceeded the expected period of time and the accumulated value did not exceeded the predetermined threshold.

10. The method of claim 6 wherein selecting a first selectable area reveals a second designated area that is visually perceptible, the second designated area identifying a plurality of subsystems and a subsystem total value for each subsystem of the plurality of subsystems, wherein the subsystem total value is equal to a sum of the numeric values for each identified message that is associated with the each subsystem of the plurality of subsystems.

11. The method of claim 10 wherein selecting a subsystem of the plurality of subsystems in the second designated area reveals a third designated area that is visually perceptible, the third designated area identifying a plurality of the identified messages and a message value for each of the plurality of the identified messages, wherein the message value is equal to a sum of the numeric values for each occurrence of an associated identified message.

12. The method of claim 11 wherein selecting one identified message of the plurality of the identified messages in the third designated area reveals a fourth designated area that is visually perceptible, the fourth designated area identifying a date and time for each occurrence of the one identified message.

13. The method of claim 12 wherein selecting one date and time in the fourth designated area reveals a fifth designated area, the fifth designated area identifying a portion of the report stream containing at least one of the predetermined messages that is associated with the one date and time in the fourth designated area.

14. The method of claim 3 further comprising the step of:
  I) ending receipt of the report stream upon an entry into a stage of the software upgrade.

15. The method of claim 1 wherein the predetermined messages relate to a hardware event on the switch.

16. The method of claim 15 wherein the predetermined messages relate to a hardware error on the switch.

17. The method of claim 15 wherein the predetermined messages relate to a hardware failure on the switch.

18. The method of claim 1 wherein the report stream is a serial stream of text messages.

19. The method of claim 18 wherein the report stream is received via a modem.

20. An apparatus for monitoring the state of a telecommunications switch comprising:
  a report receiver that receives a stream of messages from the telecommunications switch to produce a received stream of messages, wherein the stream of messages includes a plurality of messages reflecting a state of the telecommunications switch;
  a processor coupled to the report receiver that:
    stores the received stream of messages;
    searches the received stream of messages for predetermined messages to produce identified messages, wherein each identified message has a numerical value;
    accumulates an accumulated value equal to a sum of the numeric values for each identified message; and
    determines whether the accumulated value exceeds a predetermined threshold; and
  a user interface that is coupled to the processor to reflect whether the accumulated value exceeds the predetermined threshold.

21. The apparatus of claim 20 wherein the report receiver receives the report stream for an actual period of time;
  wherein the processor compares the actual period of time to an expected period of time; and
  wherein the user interface reflects whether the actual period of time exceeded the expected period of time.

22. The apparatus of claim 20 wherein the processor stores a date and time for receipt of each identified message.

23. The apparatus of claim 22 wherein the processor stores each identified message.

24. The apparatus of claim 21 wherein the user interface includes a first designated area to reflect whether the accumulated value exceeds the predetermined threshold, wherein the first designated area is visually perceptible.

25. The apparatus of claim 24 wherein the first designated area is colored a first predetermined color to reflect that the accumulated value exceeded the predetermined threshold.

26. The apparatus of claim 25 wherein the first designated area is colored a second predetermined color to reflect that the accumulated value did not exceeded the predetermined threshold and the actual period of time exceeded the expected period of time.

27. The apparatus of claim 26 wherein the first designated area is colored a third predetermined color to reflect that the actual period of time did not exceeded the expected period of time and the accumulated value did not exceeded the predetermined threshold.

28. The apparatus of claim 24 wherein in response to a user selecting the first designated area, the user interface reveals a second designated area that is visually perceptible, the second designated area identifying a plurality of subsystems and a subsystem total value for each subsystem of the plurality of subsystems, wherein the subsystem total value is equal to a sum of the numeric values for each identified message that is associated with the each subsystem of the plurality of subsystems.

29. The apparatus of claim 28 wherein in response to a user selecting a subsystem of the plurality of subsystems in the second designated area, the user interface reveals a third designated area that is visually perceptible, the third designated area identifying a plurality of the identified messages and a message value for each of the plurality of the identified messages, wherein the message value is equal to a sum of the numeric values for each occurrence of an associated identified message.

30. The apparatus of claim 29 wherein in response to a user selecting one identified message of the plurality of the identified messages in the third designated area, the user interface reveals a fourth designated area that is visually perceptible, the fourth designated area identifying a date and time for each occurrence of the one identified message.

31. The apparatus of claim 30 wherein in response to a user selecting one date and time in the fourth designated area, the user interface reveals a fifth designated area, the fifth designated area identifying a portion of the report stream containing at least one of the predetermined messages that is associated with the one date and time in the fourth designated area.

32. The apparatus of claim 20 wherein the predetermined messages relate to a hardware event on the switch.

33. The apparatus of claim 32 wherein the predetermined messages relate to a hardware error on the switch.

34. The apparatus of claim 32 wherein the predetermined messages relate to a hardware failure on the switch.

35. The apparatus of claim 20 wherein the report stream is a serial stream of text messages.

36. The apparatus of claim 35 wherein the report stream is received via a modem.

* * * * *